United States Patent
Wild et al.

(10) Patent No.: US 11,538,364 B2
(45) Date of Patent: *Dec. 27, 2022

(54) COMBINED RECEIPT AND LABEL ROLL HAVING OPTIMAL ADHESIVE PATCH PATTERNS AND A METHOD OF MANUFACTURING THEREOF

(71) Applicant: Iconex LLC, Duluth, GA (US)

(72) Inventors: Martha Patricia Wild, Duluth, GA (US); Abraham Van Staalduinen, Hoschton, GA (US); Austin Daniel Anderson, Dacula, GA (US)

(73) Assignee: Iconex LLC, Duluth, GA (US)

( * ) Notice: Subject to any disclaimer, the term of this patent is extended or adjusted under 35 U.S.C. 154(b) by 66 days.

This patent is subject to a terminal disclaimer.

(21) Appl. No.: 15/269,508

(22) Filed: Sep. 19, 2016

(65) Prior Publication Data

US 2017/0018210 A1    Jan. 19, 2017

Related U.S. Application Data

(63) Continuation of application No. 14/038,287, filed on Sep. 26, 2013, now Pat. No. 9,449,533.

(51) Int. Cl.
*G09F 3/10*    (2006.01)
*B41M 5/42*    (2006.01)
(Continued)

(52) U.S. Cl.
CPC ............ *G09F 3/10* (2013.01); *B32B 37/1284* (2013.01); *B32B 37/18* (2013.01); *B41M 5/42* (2013.01);
(Continued)

(58) Field of Classification Search
CPC ............ B41M 2205/36; C09J 2205/11; C09F 2003/0211; C09F 2003/0241;
(Continued)

(56) References Cited

U.S. PATENT DOCUMENTS 4,166,152 A    8/1979    Baker et al.
8,445,104 B2 *  5/2013   Vigunas ................. B41J 3/4075
                                                       428/211.1
(Continued)

FOREIGN PATENT DOCUMENTS

EP    1577860 A2    9/2005
EP    255138    *  1/2013   ............. G09F 3/10
EP    2551838 A1    1/2013

OTHER PUBLICATIONS

"U.S. Appl. No. 14/038,287, Final Office Action dated Jul. 8, 2015", 4 pgs.
(Continued)

*Primary Examiner* — Gerard Higgins
(74) *Attorney, Agent, or Firm* — Schwegman Lundberg & Woessner, P.A.

(57) ABSTRACT

A combined receipt and label roll comprises a core, and a web having a longitudinally-extending axis and wound on the core along the axis. The web includes (i) a substrate having a front side and a back side opposite the front side, (ii) a thermally-sensitive coating disposed on the front side of the substrate, and (iii) a water-based microsphere adhesive disposed on the back side of the substrate along the web axis. The water-based microsphere adhesive comprises at least four separate adhesive patches. The at least four adhesive patches are both sized relative to each other and positioned relative to each other on the back side of the substrate such that additional tack desired can be obtained by increasing volume of the adhesive patches without having to increase coat weight of the adhesive patches.

6 Claims, 7 Drawing Sheets

(51) Int. Cl.
  *G09F 3/00* (2006.01)
  *B32B 37/12* (2006.01)
  *B32B 37/18* (2006.01)
  *G09F 3/02* (2006.01)

(52) U.S. Cl.
  CPC ....... *G09F 3/0286* (2013.01); *B41M 2205/36* (2013.01); *B41M 2205/40* (2013.01); *C09J 2301/412* (2020.08); *G09F 2003/0201* (2013.01); *G09F 2003/0211* (2013.01); *G09F 2003/0229* (2013.01); *G09F 2003/0241* (2013.01); *G09F 2003/0248* (2013.01); *Y10T 156/10* (2015.01)

(58) Field of Classification Search
  CPC ..... C09F 2003/0248; Y10T 428/24802; Y10T 428/249; G09F 3/02; G09F 3/0286; G09F 2003/0201
  USPC .......................................... 503/200, 206, 215
  See application file for complete search history.

(56) References Cited

U.S. PATENT DOCUMENTS

| | | |
|---|---|---|
| 9,449,533 B2 | 9/2016 | Wild et al. |
| 2007/0267146 A1 | 11/2007 | Vigunas et al. |
| 2015/0086732 A1 | 3/2015 | Wild et al. |

OTHER PUBLICATIONS

"U.S. Appl. No. 14/038,287, Non Final Office Action dated Jan. 7, 2016", 4 pgs.

"U.S. Appl. No. 14/038,287, Non Final Office Action dated Mar. 18, 2015", 5 pgs.

"U.S. Appl. No. 14/038,287, Notice of Allowance dated May 19, 2016", 7 pgs.

"U.S. Appl. No. 14/038,287, Notice of Allowance dated Sep. 30, 2015", 6 pgs.

"U.S. Appl. No. 14/038,287, Preliminary Amendment filed Nov. 19, 2013", 10 pgs.

"U.S. Appl. No. 14/038,287, Response filed Apr. 7, 2016 to Non Final Office Action dated Jan. 7, 2016", 8 pgs.

"U.S. Appl. No. 14/038,287, Response filed Jun. 9, 2015 to Non Final Office Action dated Mar. 18, 2015", 10 pgs.

"U.S. Appl. No. 14/038,287, Response filed Sep. 9, 2015 to Final Office Action dated Jul. 8, 2015", 9 pgs.

"European Application Serial No. 14180798.2, Extended European Search Report dated Mar. 17, 2015", 12 pgs.

"European Application Serial No. 14180798.2, Office Action dated Apr. 18, 2016", 11 pgs.

"European Application Serial No. 14180798.2, Response filed May 12, 2015 to Extended European Search Report dated Mar. 17, 2015", 12 pgs.

"European Application Serial No. 14180798.2, Response filed Aug. 18, 2016 to Office Action dated Apr. 18, 2016", 9 pgs.

"European Applications Serial. No. 14180798, Office Action dated Apr. 18, 2016", 11 pgs.

Witte, Mike, "Microsphere Adhesives Open a World of Possibilities", *ASI Adhesives & Sealant*, [online], [retrieved on Sep. 25, 2013], (Oct. 1, 2010), 4 pgs.

Witte, Mike, "Microsphere adhesives: New performance and applications", *Micronax Converting Quarterly*, (Feb. 2012), 61-63.

* cited by examiner

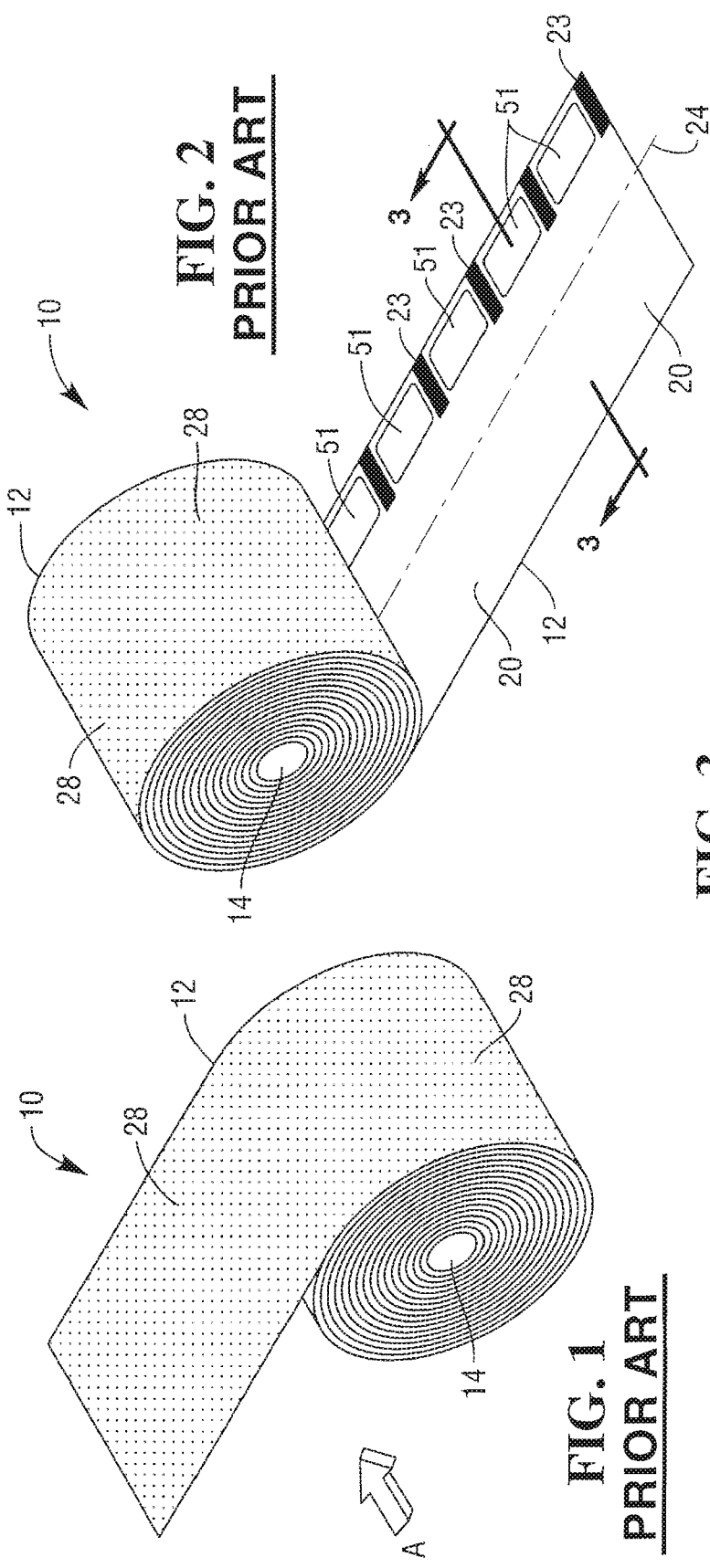

| I | II | III | IV | V | VI | VII |
|---|---|---|---|---|---|---|
| PATCH PATTERN | S1 | S2=1.8S1 | S3=2S1 | S4=2S2=3.6S1 | TOTAL PATCHES IN TERMS OF S1 | # ADHESIVE PATCHES |
| A | 0 | 0 | 2 | 2 | 11.2 | 4 |
| B | 0 | 0 | 7 | 0 | 14 | 7 |
| C | 0 | 0 | 2 | 2 | 11.2 | 4 |
| D | 0 | 0 | 7 | 0 | 14 | 7 |
| E | 0 | 0 | 4 | 2 | 15.2 | 6 |
| F | 0 | 0 | 2 | 2 | 11.2 | 4 |
| G | 9 | 0 | 0 | 0 | 9 | 9 |
| H | 0 | 5 | 0 | 0 | 9 | 5 |
| I | 0 | 5 | 0 | 0 | 9 | 5 |
| J | 5 | 0 | 0 | 0 | 5 | 5 |

TABLE: SIZE RELATIONSHIPS OF THE ADHESIVE PATCHES FOR EACH ADHESIVE PATCH PATTERN

COMBINED RECEIPT AND LABEL ROLL HAVING OPTIMAL ADHESIVE PATCH PATTERNS AND A METHOD OF MANUFACTURING THEREOF

RELATED APPLICATIONS

This Application is a continuation of U.S. patent application Ser. No. 14/038,287, filed Sep. 26, 2013, entitled: "Combined Receipt and Label Roll having Optimal Adhesive Patch Patterns and a Method of Manufacturing thereof," now issued as U.S. Pat. No. 9,449,533; the disclosure of which is incorporated by reference herein in its entirety.

BACKGROUND

The present application relates to combined receipt and label rolls, and is particularly directed to a combined receipt and label roll having optimal adhesive patch patterns and a method of manufacturing thereof.

A known combined receipt and label roll 10 is shown in FIGS. 1-3. The combined roll 10 comprises a continuous web 12 of material wound in a spiral around a core 14. The web 12 includes a substrate 16 (FIG. 3) having a front side 18 and a back side 20 opposite the front side. A pattern of adhesive patches 51 are disposed on the back side 20 of the substrate 16. The adhesive pattern 51 covers a portion of the back side 20, and extends along a longitudinal running axis 24 (FIG. 2) of the web 12.

A thermal-sensitive coating 26 is disposed on the front side 18 of the substrate 16. A release coating 28 is disposed on the thermal sensitive coating 26, and is also disposed on the front side 18 of the substrate layer 16. The release coating 28 prevents adhesive 51 on the back side 20 of the substrate 16 from sticking to the front side 18 when the web 12 is wound on the core 14. Sense marks 23 are disposed between patches of adhesive 51. Sense marks 23 tell a printer where a cut should be made to the web 12 to provide an individual combined receipt and label.

During use of the combined roll 10 of FIGS. 1-3 in a direct thermal printer (not shown), the printer thermally images a portion of the thermal-sensitive coating layer 26 to provide receipt information on the thermally-imaged portion. A movable cutting blade of the printer then cuts the web 12 at one of the sense marks 23 in cross-section to provide a combined receipt and label 30 as shown in FIG. 4. Alternatively, the web 12 may be cut in cross-section by a user manually tearing it against a stationary cutting blade of the printer to provide the combined receipt and label 30.

In an example use of the combined receipt and label 30 of FIG. 4, a retail merchant (such as a fast food restaurant) attaches the combined receipt and label 30 by way of the adhesive 51 to a purchased item (such as an order made by a retail customer in the fast food restaurant). The attached combined receipt and label 30 functions as a temporary label for the merchant to identify the order to be delivered to the particular customer. After the customer receives the order from the merchant, the customer removes the combined receipt and label 30 and can keep it as a permanent receipt of the order transaction.

A drawback of the combined roll 30 of FIGS. 1-3 is that print quality can be significantly reduced when higher viscosity adhesive needs to be used to provide a desired higher adhesive tack. Adhesive tack can be increased by increasing adhesive viscosity. However, adhesive that has been designed to run at a certain viscosity becomes unstable when it has to run at higher viscosity. In addition, the higher viscosity adhesive may be difficult or impossible to flow through an adhesive pump. The higher viscosity adhesive also results in accumulation of adhesive on print heads of printers. The accumulated adhesive blocks printing elements within print heads of printers, and thereby reduces print quality during printing. Accumulated adhesive may also cause jamming during printing. It would be desirable to provide a combined receipt and label roll in which adhesive accumulation is eliminated or at least reduced.

SUMMARY

In accordance with one embodiment, a combined receipt and label roll comprises a core, and a web having a longitudinally-extending axis and wound on the core along the axis. The web includes (i) a substrate having a front side and a back side opposite the front side, (ii) a thermally-sensitive coating disposed on the front side of the substrate, and (iii) a water-based microsphere adhesive disposed on the back side of the substrate along the web axis. The water-based microsphere adhesive comprises at least four separate adhesive patches. The at least four adhesive patches are both sized relative to each other and positioned relative to each other on the back side of the substrate such that any additional tack desired can be obtained by increasing volume of the adhesive patches without having to increase coat weight of the adhesive patches.

In accordance with another embodiment, a combined receipt and label comprises a substrate having a front side and a back side opposite the front side. The combined receipt and label further comprises a thermally-sensitive coating disposed on the front side of the substrate. The combined receipt and label also comprises a water-based microsphere adhesive disposed on the back side of the substrate and comprising at least four separate adhesive patches. Each one of four quadrants on the back side of the substrate has positioned therein at least some adhesive from the at least four adhesive patches. Size of one of the at least four adhesive patches is a base size from which size of each of remaining adhesive patches of the at least four adhesive patches is calculated.

In accordance with yet another embodiment, a method is provided of manufacturing a combined receipt and label based upon a first predetermined adhesive patch size. The method comprises electronically by a processor, calculating a second predetermined adhesive patch size based upon the first predetermined adhesive patch size. The method further comprises applying a first set of at least two water-based microsphere adhesive patches having the first predetermined adhesive patch size on the back side of the label, and applying a second set of at least two water-based microsphere adhesive patches having the second predetermined adhesive patch size on the back side of the label. The method also comprises aligning adhesive patches of the first and second sets of adhesive patches relative to each other on the back side of the label such that peel force of the label is increased without having to increase either viscosity or coat weight of the first and second sets of adhesive patches.

BRIEF DESCRIPTION OF THE DRAWINGS

FIG. 1 is a perspective view of a known combined receipt and label roll, and showing front side of the roll.

FIG. 2 is a perspective view, looking generally in the direction of arrow A shown in FIG. 1, and showing back side of the known combined receipt and label roll.

FIG. 3 is a cross-sectional view, taken approximately along line 3-3 shown in FIG. 2, and showing layers of material of the known combined receipt and label roll.

DETAILED DESCRIPTION

Figure 4:
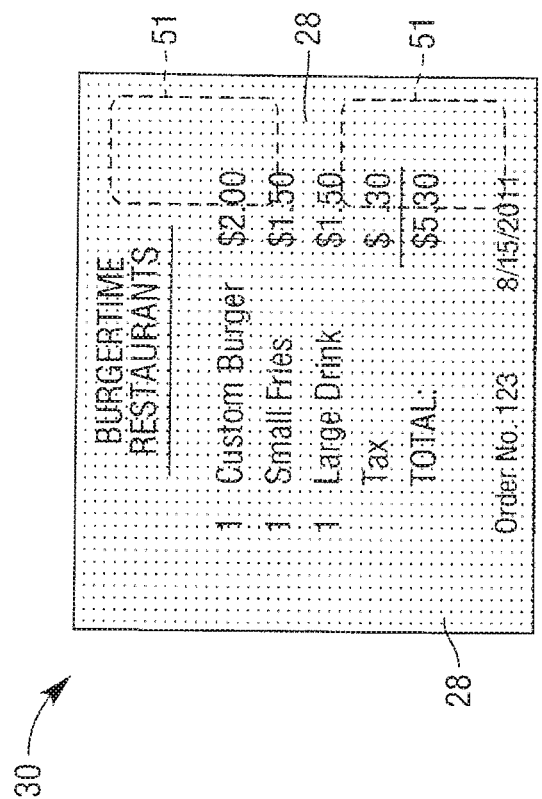
FIG. 4 is a front view of a combined receipt and label which has been cut from the known combined receipt and label roll of FIGS. 1-3.
Figure 5:
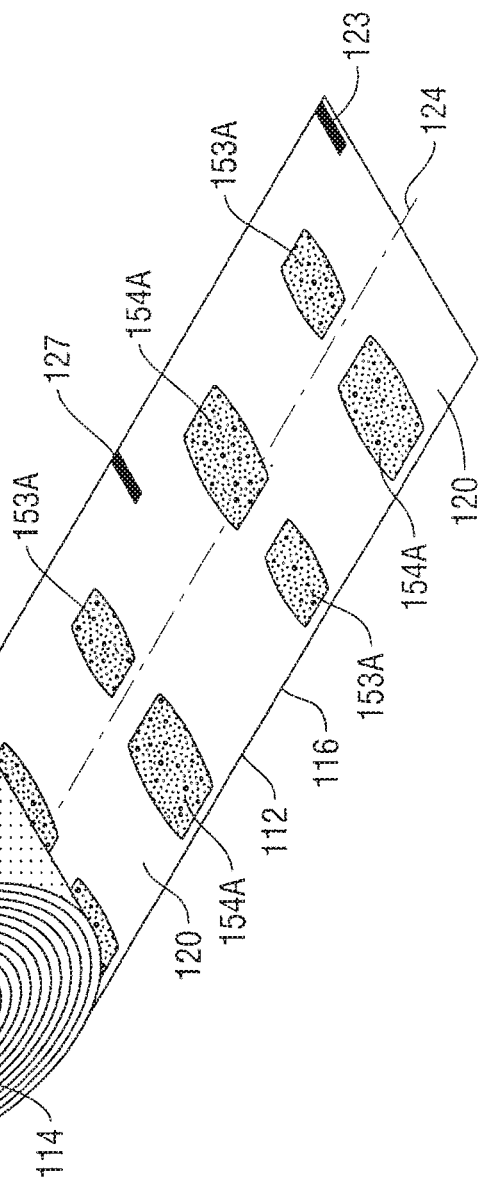
FIG. 5 is a perspective view similar to the perspective view of FIG. 2, and showing a combined receipt and label roll constructed in accordance with one embodiment.

Referring to FIG. 5, example combined receipt and label roll 110 includes a web 112 of material having a longitudinally-extending axis 124 along a longitudinally-running direction of the web. The web 112 of material is wound on core 114 along web axis 124.

Web 112 includes substrate 116 having front side (not shown) and back side 120 opposite the front side. Thermally-sensitive coating 126 is disposed on an area covering the front side of substrate 116. A pattern of water-based microsphere adhesive patches 153A, 154A are disposed on the back side 120 of substrate 116 along web axis 124.

Figure 6A:
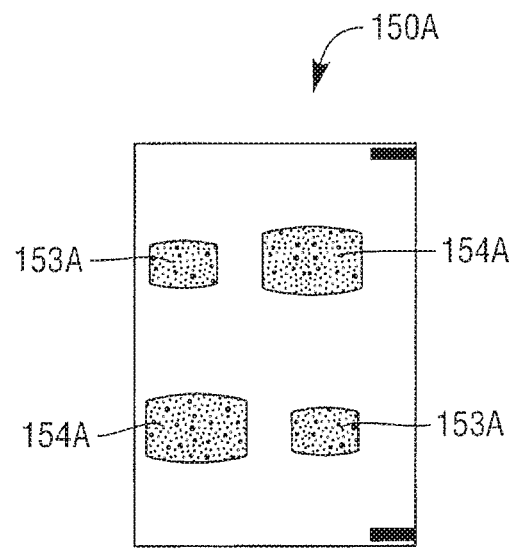
FIG. 6A is a back side view of an individual combined receipt and label which has been cut from the combined roll of FIG. 5, and showing an adhesive patch pattern in accordance with one embodiment.

FIG. 6A is a back side view of an individual combined receipt and label 150A which has been cut from the combined roll 110 of FIG. 5, and shows an adhesive patch pattern in accordance with one embodiment. There is a size relationship among the adhesive patches shown in FIG. 6A. More specifically, each adhesive patch of a first pair 153A of four adhesive patches is substantially of a first predetermined adhesive patch size, and each adhesive patch of a second pair 154A of the four adhesive patches is substantially of a second predetermined adhesive patch size which is different from the first predetermined adhesive patch size. As shown in FIG. 6A, the size of each of the first pair 153A of adhesive patches is smaller than the size of each of the second pair 154A of adhesive patches. Size relationship between the first predetermined adhesive patch size and the second predetermined adhesive patch size for the pattern of adhesive patches 153A, 154A shown in FIG. 6A will be described in more detail later with reference to the table shown in FIG. 7 after other embodiments of adhesive patch patterns are described hereinbelow.

Also, there is a positional relationship among the adhesive patches 153A, 154A shown in FIG. 6A. More specifically, the adhesive patches of the first pair 153A are aligned relative to each other in a diagonal relationship on the back side of the substrate, and the adhesive patches of the second pair 154A are aligned relative to each other in a diagonal relationship on the back side of the substrate.

Release coating 128 is disposed on the front side of substrate 116 along web axis 124 to prevent adhesive from sticking to the front side of substrate 116 when web 112 is wound on core 114. Release coating 128 may be disposed on the entire front side of substrate 116, or on only a portion of the front side of substrate 116. Sense marks 123 are disposed between adhesive patches. Color of sense marks 123 may be black, for example. Sense marks 123 tell the printer where a cut should be made to provide an individual combined receipt and label, such as shown in FIG. 6A and designated with the reference numeral "150A".

The pattern of adhesive patches 153A, 154A shown in FIG. 6A is one embodiment. Adhesive patch patterns in other embodiments, such as shown in FIG. 6B through FIG. 6J, are possible. Since embodiments illustrated in FIGS. 6B-6J are generally similar to the embodiment illustrated in FIG. 6A, similar numerals are utilized to designate similar components, the suffix letter "B, C, D, E, F, G, H, I, J" being associated with the embodiments of FIGS. 6B, 6C, 6D, 6E, 6F, 6G, 6H, 6I, 6J, respectively, to avoid confusion.

Figure 6B:
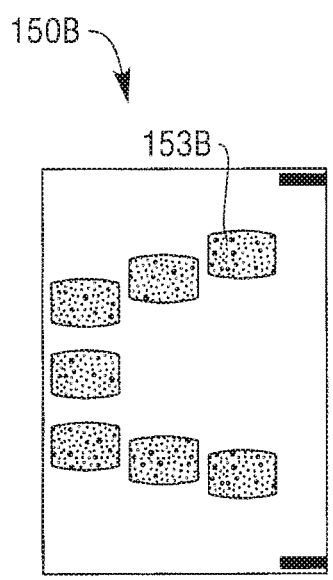
FIGS. 6B-6J are back side views similar to the back side view of FIG. 6A, and showing adhesive patch patterns in accordance with other embodiments.

As shown in FIG. 6B, combined receipt and label 150B includes at least seven adhesive patches 153B of substantially the same adhesive patch size. The at least seven adhesive patches 153B are aligned relative to each other to form a substantially U-shape arrangement of the adhesive patches on the back side of the substrate, as shown in FIG. 6B.

Figure 6C:
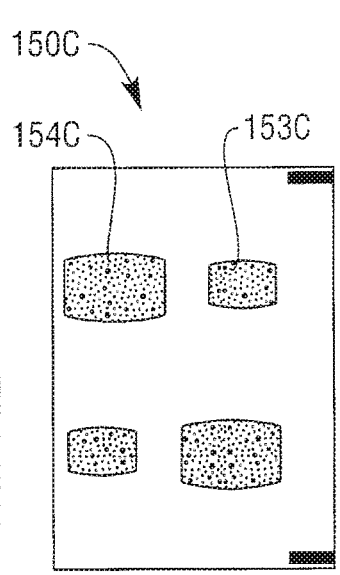

As shown in FIG. 6C, combined receipt and label 150C is similar to combined receipt and label 150A of FIG. 6A. The positions of a first pair 153C and a second pair 154C of adhesive patches of FIG. 6C are swapped as compared with the positions of the first pair 153A and the second pair 154A of adhesive patches of FIG. 6A.

Figure 6D:
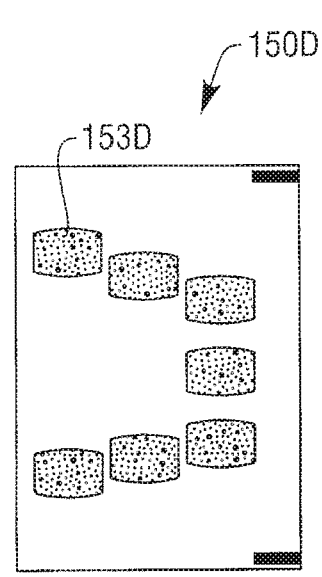

As shown in FIG. 6D, combined receipt and label 150D is similar to combined receipt and label 150B of FIG. 6B. The positions of at least seven adhesive patches 153C of FIG. 6D are aligned relative to each other to form a substantially U-shape arrangement of the adhesive patches pointing in a direction which is different from the direction in which the substantially U-shaped arrangement of adhesive patches 153B of FIG. 6B is pointing.

Figure 6E:
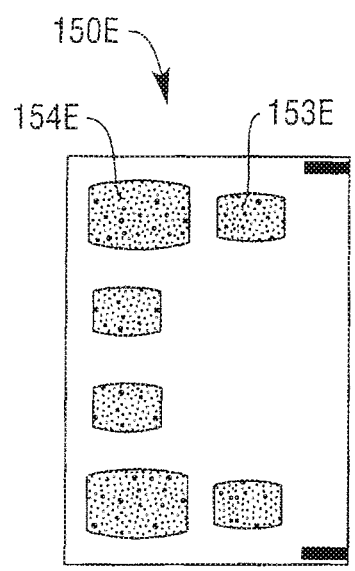

As shown in FIG. 6E, combined receipt and label 150E includes at least six adhesive patches in which two adhesive patches 154E of the six adhesive patches are substantially a first predetermined adhesive patch size, and four adhesive patches 153E of the six adhesive patches are substantially a second predetermined adhesive patch size which is smaller than the first predetermined adhesive patch size. The at least six adhesive patches 153E, 154E are aligned relative to each other to form a substantially C-shape arrangement of the adhesive patches on the back side of the substrate, as shown in FIG. 6E.

Figure 6F:
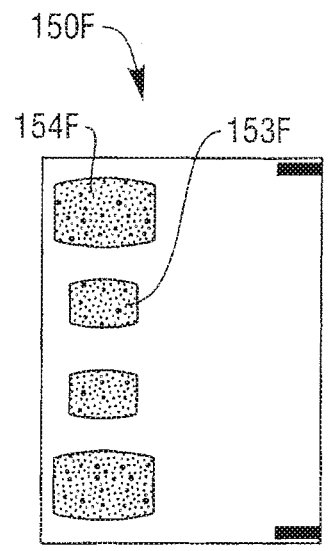

As shown in FIG. 6F, combined receipt and label 150F includes two pairs of adhesive patches. Each adhesive patch of a first pair 153F of the at least four adhesive patches is substantially of a first predetermined adhesive patch size. Each adhesive patch of a second pair 154F of the at least four adhesive patches is substantially a second predetermined adhesive patch size which is greater than the first predetermined adhesive patch size. The at least four adhesive patches 153F, 154F are aligned relative to each other to form a substantially I-shape arrangement of the adhesive patches on the back side of the substrate, as shown in FIG. 6F.

Figure 6G:
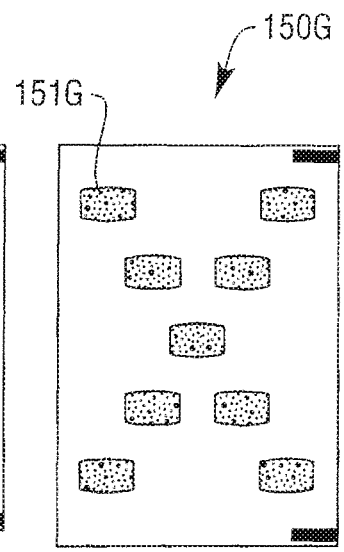

As shown in FIG. 6G, combined receipt and label 150G includes at least nine adhesive patches 151G of substantially the same adhesive patch size. The at least nine adhesive patches 151G are aligned relative to each other to form a substantially X-shape arrangement of the adhesive patches on the back side of the substrate, as shown in FIG. 6G.

Figure 6H:
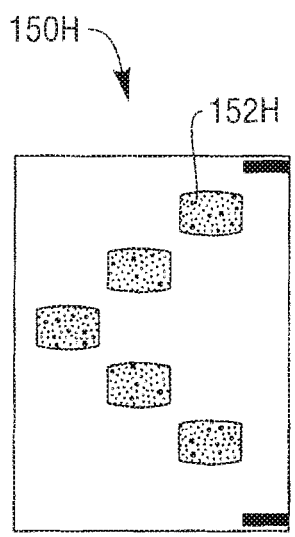

As shown in FIG. 6H, combined receipt and label 150H includes at least five adhesive patches 152H of substantially the same adhesive patch size. The at least five adhesive patches 152H are aligned relative to each other to form a substantially V-shape arrangement of the adhesive patches on the back side of the substrate, as shown in FIG. 6H.

Figure 6I:
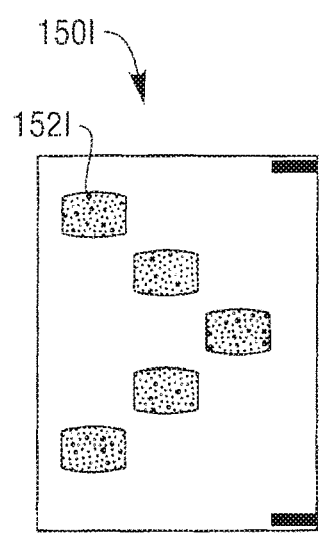

As shown in FIG. 6I, combined receipt and label 150I is similar to combined receipt and label 150H of FIG. 6H. The positions of at least five adhesive patches 152I of FIG. 6I are aligned relative to each other to form a substantially V-shape arrangement of the adhesive patches pointing in a direction which is different from the direction in which the substantially V-shaped arrangement of adhesive patches 152H of FIG. 6H is pointing.

Figure 6J:
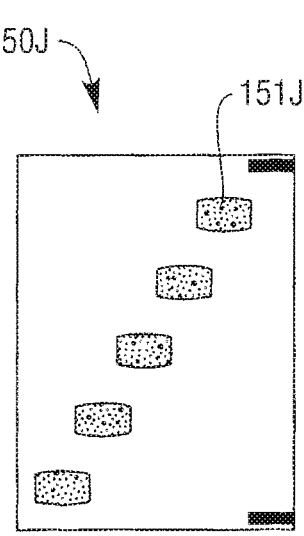

As shown in FIG. 6J, combined receipt and label 150J includes at least five adhesive patches 151J of substantially the same adhesive patch size. The at least five adhesive patches 151J are aligned relative to each other to form a substantially diagonal line arrangement of the adhesive patches on the back side of the substrate, as shown in FIG. 6J.

As mentioned, there is a size relationship between adhesive patches when there are different sizes of adhesive patches in the above-described embodiments of adhesive patches. Size relationships can be better explained with reference to the table of FIG. 7 when different size patches are involved. Columns II, III, IV, and V show four different adhesive patch sizes (i.e., S1, S2, S3, and S4) associated with each adhesive patch pattern shown in column I of FIG. 7. Size S1 is a base size from which the other three sizes (i.e., S2, S3, and S4) are calculated. More specifically, size S2 is 1.8 times the size S1, size S3 is twice the size S1, and size S4 is twice the size S2 or 3.6 times the size S1. Column VI shows the total number of adhesive patches in multiple terms of size S1. Column VII shows the absolute total number of adhesive patches with no reference to any particular adhesive patch size.

A number of advantages result by providing combined receipt and labels 150A-150J shown in FIGS. 6A-6J, respectively. One advantage is that increased tack of adhesive patches can be achieved by increasing adhesive volume without having to increase either viscosity or coat weight of adhesive patches. This advantageous feature is illustrated in the line graph of FIG. 8 which shows the peel force (and therefore the adhesive tack) associated with the different adhesive patch sizes of FIG. 7 for each of the embodiments shown in FIGS. 6A-6J.

Figures 7, 8:
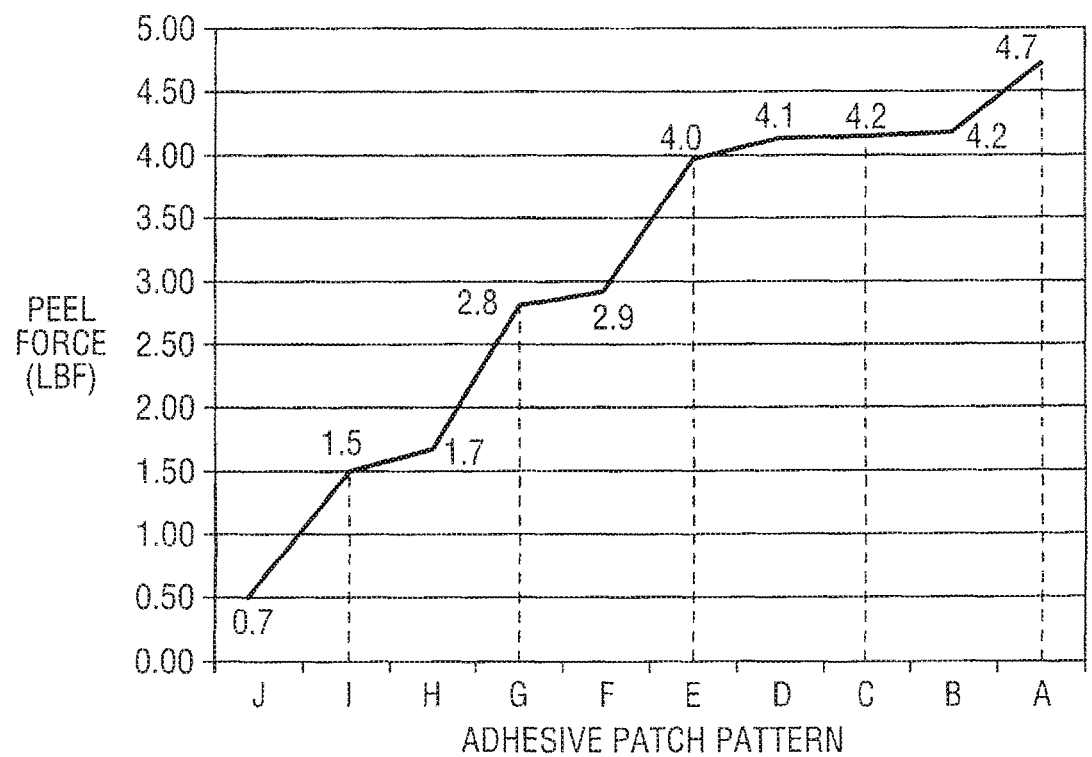
FIG. 7 is a table showing number of adhesive patches and relative sizes of the adhesive patches for each of the embodiments shown in FIGS. 6A-6J.
FIG. 8 is a line graph illustrating peel force associated with the adhesive patches of FIG. 7 for each of the embodiments shown in FIGS. 6A-6J.

As can be seen from FIG. 8, the highest adhesive tack was obtained from adhesive patch pattern A with a peel force of 4.7 lbf (pound-force). The lowest adhesive tack was obtained from adhesive patch pattern J with a peel force of 0.7 lbf. The line graph FIG. 8 can be explained further using the following equations to calculate results shown in FIG. 8.

To calculate the amount of adhesive per quadrant to determine an optimal configuration of the adhesive patches to achieve higher peel strength, the procedures are as follows:

Equation 1 is used to calculate the coat weight (dry mass) of adhesive on the patches ($S_i$) in each quadrant.

$$A_i = [(CW_{Si})/\Sigma P_i S_i] \times (P_i \times S_i) \quad \text{(Equation 1)}$$

Where:
$A_i$=adhesive dry mass in gsm (grams per square meter) in each quadrant
$CW_{Si}$=adhesive coat weight (measured)

The combined receipt and label is divided into four quadrants. The number of adhesives patches (whole or fraction of a patch) in each quadrant is multiply by the size of the patch (expressed in terms of $S_1$ as demonstrated in Equation 2 below:

$$\Sigma P_i S_i = P_1 \times S_1 + P_2 \times S_2 + P_3 \times S_3 + P_4 \times S_4 \quad \text{(Equation 2)}$$

The first term of the equation $P_1 \times S_1$ represents the first quadrant of the combined receipt and label.
  P=number of patches (the number can be whole or fraction)
  i=refers to the patch in each quadrant (1 refers to the first quadrant, 2 to the second quadrant, and so forth)
  $S_i$=is the size of the patch in each quadrant, with:
   a. $S_1$=the smallest patch that has a value of 1
   b. $S_2$=1.8 $S_1$
   c. $S_3$=2$S_1$
   d. $S_4$=3.6 $S_1$ Example: To calculate the number of patches of size $S_1$ for FIG. 6E, the equation would be:

$$\sum P_i S_i = (1 \times S_4 + 1 \times S_3) + (1 \times S_3) + (1 \times S_4 + 1 \times S_3) + (1 \times S_3)$$
$$= (1 \times 3.6\ S_1 + 1 \times 2\ S_1) + (1 \times 2\ S_1) +$$
$$(1 \times 3.6\ S_1 + 1 \times 2\ S_1) + (1 \times 2\ S_1)$$
$$= (5.6 + 2 + 5.6 + 2 = 15.2)\ S_1$$
$$= 15.2 S_1$$

The values for the size of the patches that go in each quadrant and for total patches are shown in Table 1 below.

TABLE 1

Calculation of adhesive volume in terms of $S_i$ per quadrant

| Patch Pattern | $P_1 \times S_1$ in Quadrant 1 | $P_2 \times S_2$ in Quadrant 2 | $P_3 \times S_3$ in Quadrant 3 | $P_4 \times S_4$ in Quadrant 4 | $\Sigma P_i S_i$ Total Volume of Patches in Term of S1 |
|---|---|---|---|---|---|
| A | 2 | 3.6 | 3.6 | 2 | 11.2 |
| B | 4 | 3 | 4 | 3 | 14 |
| C | 3.6 | 2 | 2 | 3.6 | 11.2 |
| D | 3 | 4 | 3 | 4 | 14 |
| E | 5.6 | 2 | 5.6 | 2 | 15.2 |
| F | 5.6 | 0 | 5.6 | 0 | 11.2 |
| G | 2.25 | 2.25 | 2.25 | 2.25 | 9 |
| H | 1.8 | 2.7 | 1.8 | 2.7 | 9 |
| I | 2.7 | 1.8 | 2.7 | 1.8 | 9 |
| J | 0.25 | 2.25 | 2.25 | 0.25 | 5 |

Substituting values for $CW_{Si}$, $\Sigma P_i S_i$ and ($P_i \times S_i$) to find $A_i$ in equation 1 we get the results are shown in the Table 2 below:

TABLE 2

Adhesive total coat weight (CW) and distribution per quadrant

| Patch Pattern | CW | $A_1$ | $A_2$ | $A_3$ | $A_4$ | Peel Force |
|---|---|---|---|---|---|---|
| F | 8.51 | 4.26 | 0 | 4.26 | 0 | 2.91 |
| G | 9.54 | 2.39 | 2.39 | 2.39 | 2.39 | 2.81 |
| J | 9.8 | 0.49 | 4.42 | 4.42 | 0.49 | 0.67 |

TABLE 2-continued

Adhesive total coat weight (CW) and distribution per quadrant

| Patch Pattern | CW | $A_1$ | $A_2$ | $A_3$ | $A_4$ | Peel Force |
|---|---|---|---|---|---|---|
| A | 9.84 | 1.76 | 3.16 | 3.16 | 1.76 | 4.16 |
| C | 9.88 | 3.18 | 1.76 | 1.76 | 3.18 | 4.68 |
| H | 10.33 | 2.07 | 3.10 | 2.07 | 3.10 | 1.69 |
| D | 11.27 | 2.42 | 3.22 | 2.42 | 3.22 | 4.14 |
| E | 11.47 | 4.23 | 1.51 | 4.23 | 1.51 | 3.99 |
| B | 11.66 | 3.33 | 2.50 | 3.33 | 2.50 | 4.17 |
| I | 13.29 | 3.99 | 2.66 | 3.99 | 2.66 | 1.51 |

Figure 9:
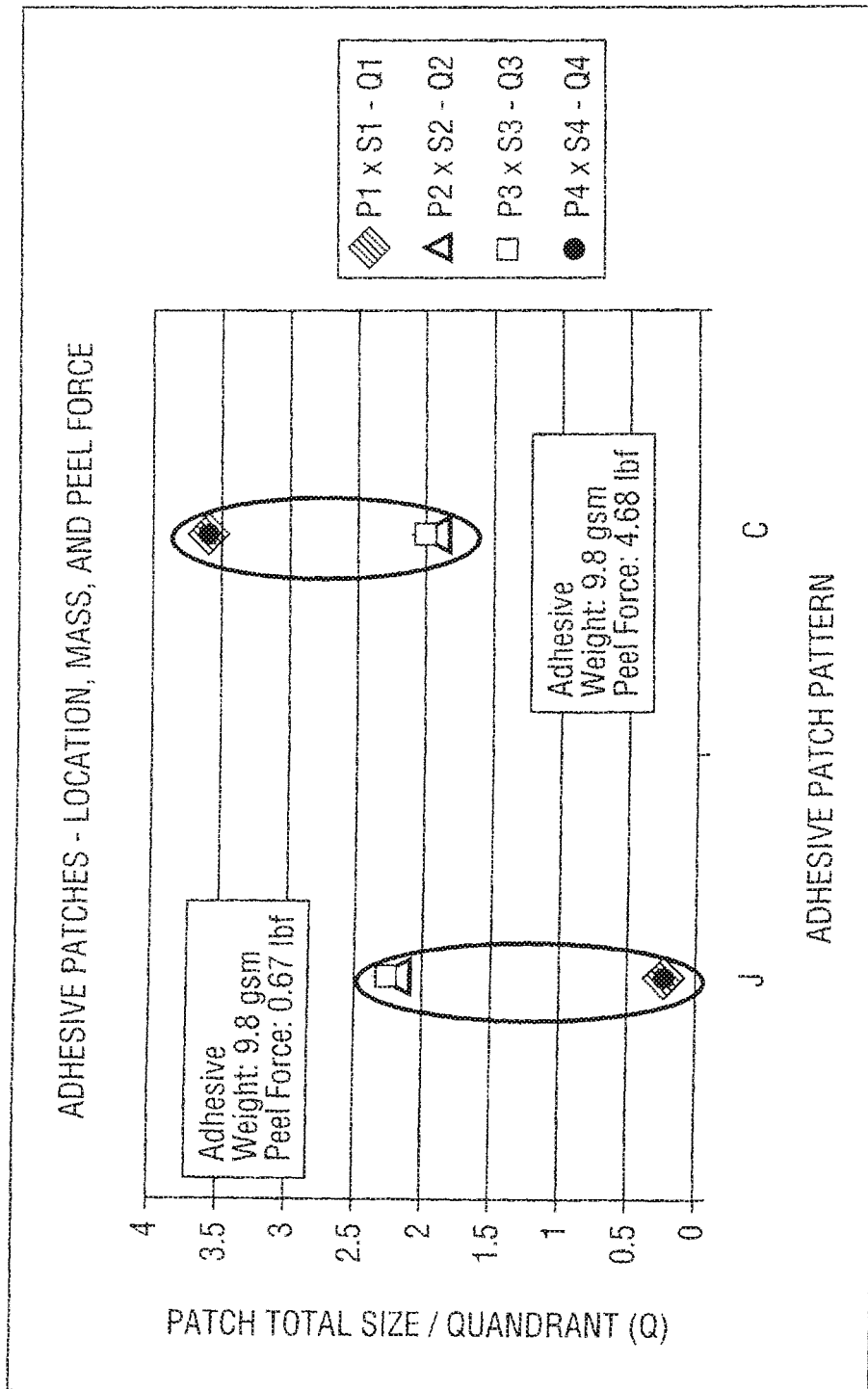
FIG. 9 illustrates adhesive volume and location in the quadrant affect peel force.

FIG. 9 illustrates adhesive volume and location in the quadrant affect peel force. In particular, FIG. 9 shows that at the same mass (coat weight) of 9.8 gsm, the peel force of the adhesive patch pattern shown in FIG. 6J is only 0.67 lbf, whilst the peel force for the one in FIG. 6C is 4.68 lbf. This significant increase in peel force is achieved by the size of patches used and the distribution of these patches in each of the four quadrants. Adhesive patch pattern J of FIG. 6J has a volume of only 0.25 $S_i$ on quadrants 3 and 4 and 2.25 $S_i$ in quadrants 1 and 2. That is, quadrants 3 and 4 had very little adhesive 0.25 $S_i$. Adhesive patch pattern "C" of FIG. 6C has a volume of 3.6 $S_i$ in quadrants 1 and 3 and 2 $S_i$ in quadrants 2 and 4. The volume in each quadrant is fairly well distributed.

Figure 10:
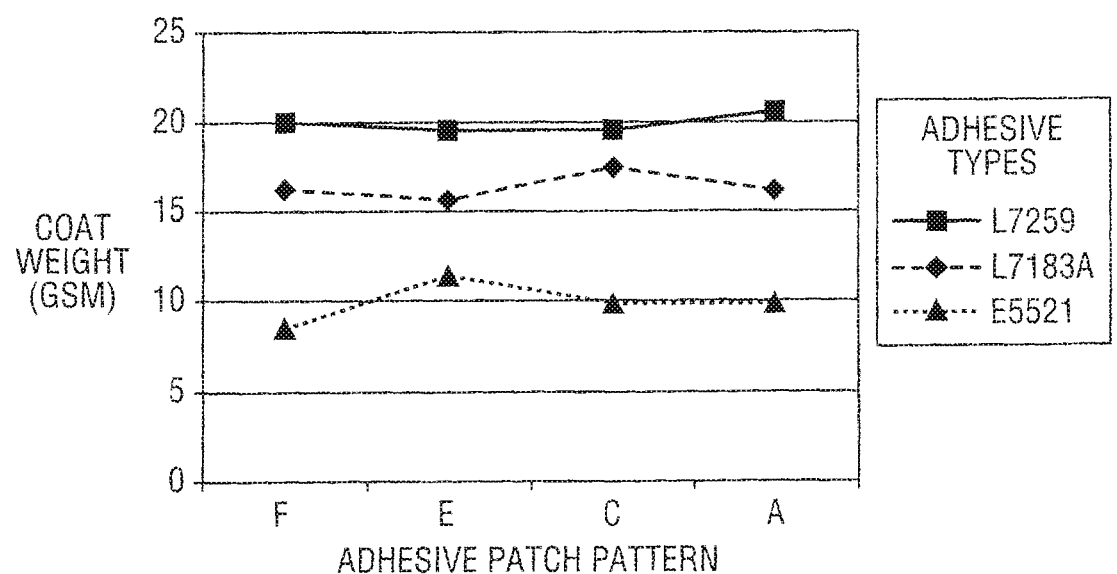
FIG. 10 is a line graph illustrating coat weight of three different types of adhesives used in four of the embodiments shown in FIGS. 6A-6J.
Figure 11:
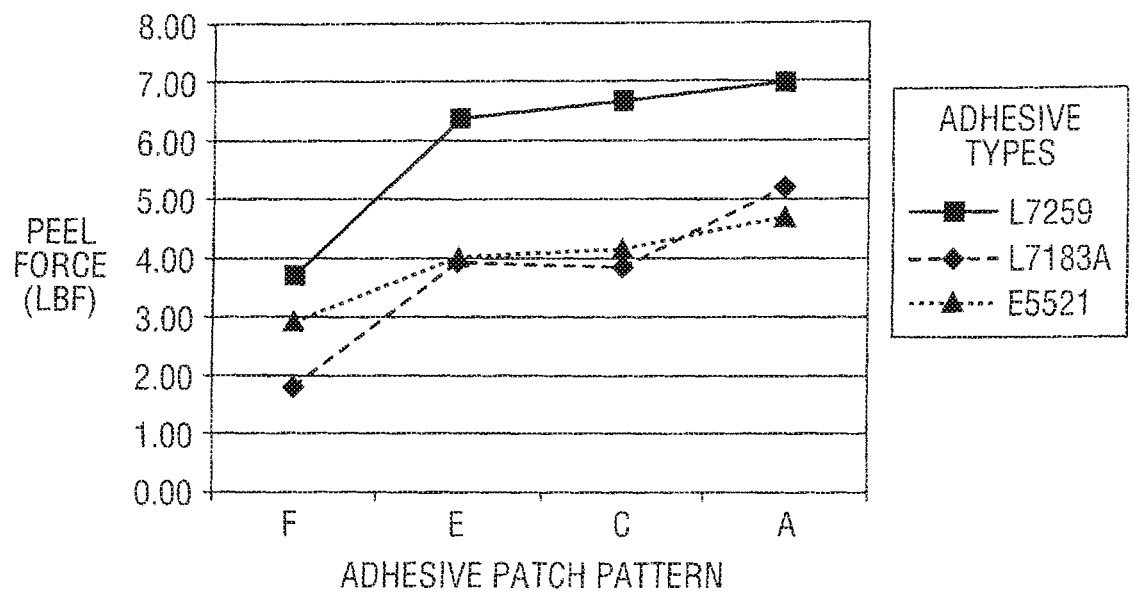
FIG. 11 is a line graph illustrating peel force associated with each of the three types adhesives of FIG. 10 used in the four of the embodiments shown in FIGS. 6A-6J.

The above advantageous feature can be explained further with reference to the line graphs of FIGS. 10 and 11 in which a comparison is made among three different types of adhesives using four of the adhesive patterns shown in FIGS. 6A-6J. The three types of adhesive being compared in FIGS. 10 and 11 are the L7183A (standard tack) provided by Bostik, Inc located in Wauwatosa, Wis.; the L7259 (high tack) also provided by Bostik, Inc.; and the E5521 provided by Avery Products Corporation located in Mentor, Ohio. Adhesive patch patterns of "A". "C". "E". "F" shown in FIGS. 6A, 6C, 6E, 6F, respectively, are the four adhesive patch patterns being compared in FIGS. 10 and 11.

More specifically, the line graph of FIG. 10 shows a comparison of coat weight of the three types of adhesives used in the four adhesive patch patterns of "A", "C", "E", "F". The line graph of FIG. 11 shows a comparison of the peel force associated with each of the three types of adhesives used in the four adhesive patch patterns of "A", "C", "E", "F".

It should be apparent from the line graphs of FIGS. 10 and 11 that an adhesive patch pattern may be selected to optimize peel force for a given coat weight of adhesive. As an example, even though the coat weight of the L7259 adhesive is pretty much constant for all four adhesive patch patterns (as shown in the line graph of FIG. 10), the adhesive patch pattern A may selected to provide the highest relative peel force (as shown in the line graph of FIG. 11). As another example, even though the coat weight of the E5521 adhesive is lower than the coat weight of the L7183A adhesive (as shown in the line graph of FIG. 10), the peel force associated with the E5521 adhesive is greater than the peel force associated with the L7183A adhesive (as shown in the line graph of FIG. 11). This was true for all four adhesive patch patterns A, C, E, and F.

Another advantage is that accumulation of adhesive on print heads of printers is reduced since viscosity associated with water-based microsphere adhesives is relatively low. Reducing accumulation of adhesive on print heads of printers helps to reduce chance of a jam occurring. Reducing accumulation of adhesive on print heads of printers also helps to improve print quality.

Still another advantage is that any regular thermal printer can be used to print linerless labels since adhesive tack associated with water-based microsphere adhesives is relatively low. Accordingly, printing of linerless labels can be performed without being restricted to use of special printers dedicated for purpose of printing linerless labels. As an example, printing of linerless labels using water-based microsphere adhesives need not be limited to using thermal printers designed for only thermal paper with adhesive on the opposite side of the thermal paper.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A combined receipt and label roll, comprising:
   a core;
   a web wound on the core, wherein the web has first and second longitudinally-extending edges, and wherein the web comprising:
   i) a substrate having a front side and a back side opposite the front side, wherein the front side includes a thermally-sensitive coating disposed on the front side;
   ii) an adhesive disposed on the back side of the substrate as at least four adhesive patches, wherein the adhesive is a water-based microsphere adhesive, and wherein each adhesive patch is positioned relative to each other on the back side of the substrate in a selected pattern, the selected pattern selected from one of ten predefined patterns, each pattern including at least one adhesive patch situated in one or more of four quadrants defined on the back side, and each patch for each pattern including a predefined size and position within at least one of the four quadrants, wherein the ten predefined patterns include:
   1) a first pattern comprising 7 adhesive patches arranged in a sideways U shape with the base of the U directed towards the first longitudinally-extending edge, wherein the 7 adhesive patches are of the same size;
   2) a second pattern comprising two pairs of adhesive patches with a first pair having a first adhesive patch size and a second pair having a second pair adhesive patch size each of the two pairs aligned relative to each other in a diagonal relationship on the back side of the substrate, wherein the two pairs of adhesive patches comprising 4 adhesive patches, wherein the first adhesive patch size is 1.8 times smaller than the second pair adhesive patch size;
   3) a third pattern comprising 7 patches arranged in a sideways U shape with the base of the U directed toward the second longitudinally-extending edge, wherein the 7 patches are of the same size, wherein each adhesive patch size of the 7 patches is 1.11 times larger than other patches associated with a seventh pattern and an eighth pattern;
   4) a fourth pattern comprising 6 adhesive patches arranged in a C shape with the side of the C directed toward the first longitudinally-extending edge, wherein two of the 6 adhesive patches are a first size and four of the 6 adhesive patches are a second size, wherein the second size is smaller than the first size, and wherein the 6 adhesive patches are in a substantially C-Shape arrangement, wherein 4 of the 6 adhesive patches are 1.8 times smaller in size than the remaining 2 of the 6 adhesive patches;

5) a fifth pattern comprising 4 adhesive patches, wherein the 4 adhesive patches are arranged to form a substantial I-shaped arrangement that longitudinally extends along a the first-longitudinally-extending edge of the substrate, wherein 2 of the 4 adhesive patches form a first pair of patches that is 1.8 time smaller that the remaining 2 of the 4 adhesive patches that form a second pair of patches;

6) a sixth pattern comprising 9 adhesive patches arranged in a X shape, wherein the 9 adhesive patches are of the same size and are of a same size as that which is associated with patches of a ninth pattern, and wherein each of the 9 adhesive patterns are 1.8 times smaller in size than other patches associated with a seventh pattern and the eighth pattern;

7) the seventh pattern comprising 5 adhesive patches arranged in a sideways V shape with a base of the sideways V shape directed toward the first longitudinally-extending, edge, wherein the 5 adhesive patches are of the same size, wherein each of the 5 adhesive patches are 1.8 times larger than patches associated with the sixth pattern and the ninth pattern;

8) the eighth pattern comprising 5 adhesive patches arranged in a sideways V shape with a base of the sideways V shape directed toward the second longitudinally-extending; edge, wherein the 5 adhesive patches are of the same size, wherein each of the 5 adhesive patches are 1.8 times larger than patches associated with the sixth pattern and the ninth pattern;

9) the ninth pattern comprising 5 adhesive patches arranged as a diagonal line, wherein the 5 adhesive patches are of the same size, wherein each of the 5 adhesive patches are of a same size as patches associated with the sixth pattern; and 10) the tenth pattern comprising 4 adhesive patches, wherein each adhesive patch pair of the 4 adhesive patches arranged diagonally to its corresponding adhesive patch, wherein a first adhesive patch pair comprising 2 of the 4 adhesive patches is 1.8 time larger in size than a second adhesive patch pair comprising the remaining 2 of the 4 adhesive patches;

wherein each pattern comprises a tack that may be obtained by measuring the peel force in pounds of force, wherein the tack associated with any given pattern is between 4.7 and 0.7 pounds of force without increasing a coat weight associated with the water-based microsphere adhesive;

wherein an optimal configuration of the adhesive patches is selected from the patterns to achieve higher peel force of labels removed or separated from the combined receipt and label roll;

wherein any given patch size of any given pattern is calculated based on a select patch size, with the given patch size being 1.8 times larger than the select patch size, being equal to the select patch size, being twice as large as the select patch size, or being 3.6 times larger than the select patch size, wherein the select patch size is a predefined smallest patch of a value of 1, wherein each given patch size in each given pattern is a multiple of the predefined smallest patch of the value of 1.

2. The combined receipt and label roll of claim 1, wherein the front side of the substrate includes a release coating that is coated on top of the thermally-sensitive coating.

3. The combined receipt and label roll of claim 1, wherein each of the at least four adhesive patches are aligned along the back side relative to one another.

4. The combined receipt and label roll of claim 1, wherein positions of the four adhesive patches on the back side of the substrate are arranged in the fifth pattern.

5. A combined receipt and label, comprising:
a substrate having a first side and a second side, a first longitudinally-extending edge, and a second longitudinally-extending edge, and wherein the first side includes a thermally-sensitive coating disposed on the first side;

wherein the back side includes at least four adhesive patches, wherein the adhesive is a water-based microsphere adhesive, and wherein a first set of at least two adhesive patches have a first size and a second set of at least two adhesive patches having a second size, and a position, the first size, the second size, and the alignment that are selected as one of ten predefined patterns wherein the ten predefined patterns include:

1) a first pattern comprising 7 adhesive patches arranged in a sideways U shape with the base of the U directed towards the first longitudinally-extending edge, wherein the 7 adhesive patches are of the same size;

2) a second pattern comprising two pairs of adhesive patches with a first pair having a first adhesive patch size and a second pair having a second pair adhesive patch size each of the two pairs aligned relative to each other in a diagonal relationship on the back side of the substrate, wherein the two pairs of adhesive patches comprising 4 adhesive patches, wherein the first adhesive patch size is 1.8 times smaller than the second pair adhesive patch size;

3) a third pattern comprising 7 patches arranged in a sideways U shape with the base of the U directed towards the second longitudinally-extending edge, wherein the 7 patches are of the same size, wherein each adhesive patch size of the 7 patches is 1.11 times larger than other patches associated with a seventh pattern and an eighth pattern;

4) A fourth pattern comprising 6 adhesive patches arranged in a C shape with the side of the C directed toward the first longitudinally-extending edge, wherein two of the 6 adhesive patches are the first size and four of the 6 adhesive patches are the second size, wherein the second size is smaller than the first size, and wherein the 6 adhesive patches are in a substantially C-Shape arrangement, wherein 4 of the 6 adhesive patches are 1.8 times smaller in size than the remaining 2 of the 6 adhesive patches;

5) a fifth pattern comprising adhesive patches, wherein the adhesive patches are arranged to form a substantial I-shaped arrangement that longitudinally extends along the first-longitudinally-extending edge of the substrate, wherein 2 of the 4 adhesive patches form a first pair of patches that is 1.8 time smaller that the remaining 2 of the 4 adhesive patches that form a second pair of patches;

6) a sixth pattern comprising 9 adhesive patches arranged in a X shape, wherein the 9 adhesive patches are of the same size and are of a same size as that which is associated with patches of a ninth pattern, and wherein each of the 9 adhesive patterns are 1.8 times smaller in size than other patches associated with a seventh pattern and the eighth pattern;

7) the seventh pattern comprising 5 adhesive patches arranged in a sideways V shape with a base of the sideways V shape directed toward the first longitudinally-extending edge, wherein the 5 adhesive patches are of the same size, wherein each of the 5 adhesive patches are 1.8 times larger than patches associated with the sixth pattern and the ninth pattern;

8) the eighth pattern comprising 5 adhesive patches arranged in a sideways V shape with a base of the sideways V shape directed toward the second longitudinally-extending edge, wherein the 5 adhesive patches are of the same size, wherein each of the 5 adhesive patches are 1.8 times larger than patches associated with the sixth pattern and the ninth pattern;

9) the ninth pattern comprising 5 adhesive patches arranged as a diagonal line, wherein the 5 adhesive patches are of the same size, wherein each of the 5 adhesive patches are of a same size as patches associated with the sixth pattern; and 10) the tenth pattern comprising 4 adhesive patches, each adhesive patch in a particular adhesive patch pair arranged diagonally to its corresponding adhesive patch, wherein a first adhesive patch pair comprising 2 of the 4 adhesive patches is 1.8 time larger in size than a second adhesive patch pair comprising the remaining 2 of the 4 adhesive patches;

wherein each pattern comprises a tack that may be obtained by measuring the peel force in pounds of force, wherein the tack associated with any given pattern is between 4.7 and 0.7 pounds of force without increasing a coat weight associated with the water-based microsphere adhesive;

wherein an optimal configuration of the adhesive patches is selected from the patterns to achieve higher peel force of labels separated from the combined receipt and label;

wherein any given patch size of any given pattern is calculated based on a select patch size, with the given patch size being equal to the select patch size, being 1.8 times larger than the select patch size, being twice as large as the select patch size, or being 3.6 times larger than the select patch size, wherein the select patch size is a predefined smallest patch of a value of 1, wherein each given patch size in each given pattern is a multiple of the predefined smallest patch of the value 1.

6. The combined receipt and label of claim 5, wherein the front side includes a release coating coated on top of and over the thermally-sensitive coating.

\* \* \* \* \*